US007180359B2

(12) United States Patent
DiTommaso

(10) Patent No.: US 7,180,359 B2
(45) Date of Patent: Feb. 20, 2007

(54) LOGARITHMIC TEMPERATURE COMPENSATION FOR DETECTORS

(75) Inventor: Vincenzo DiTommaso, Beaverton, OR (US)

(73) Assignee: Analog Devices, Inc., Norwood, MA (US)

( * ) Notice: Subject to any disclaimer, the term of this patent is extended or adjusted under 35 U.S.C. 154(b) by 28 days.

(21) Appl. No.: 11/020,897

(22) Filed: Dec. 22, 2004

(65) Prior Publication Data

US 2006/0132216 A1 Jun. 22, 2006

(51) Int. Cl.
*G06F 7/556* (2006.01)

(52) U.S. Cl. ........................................ 327/350; 327/513

(58) Field of Classification Search ......... 327/350–353, 327/512, 513

See application file for complete search history.

(56) References Cited

U.S. PATENT DOCUMENTS 4,604,532 A * 8/1986 Gilbert ........................ 327/350
4,990,803 A 2/1991 Gilbert
5,162,678 A * 11/1992 Yamasaki .................... 327/331
5,296,761 A * 3/1994 Fotowat-Ahmady et al. .... 327/350
5,352,973 A * 10/1994 Audy .......................... 323/313

OTHER PUBLICATIONS

Gilbert, Barrie; Translinear Circuits: An Historical Overview, 1996, *Analog Integrated Circuits and Signal Processing*, pp. 95-118.
Gilbert, Barrie; *Monolithic Logarithmic Amplifiers*, Aug. 1994, Analog Devices, Inc., pp. 1-122.
*DC-Coupled Demodulating 120 MHz Logarithmic Amplifier* (*AD640*), 1999, Analog Devices, Inc., pp. 1-16 (Rev. C).
Gilbert, Barrie, Analog Devices, Inc.; *Monolithic Logarithmic Amplifiers*, Aug. 1994, pp. 1-122.

* cited by examiner

*Primary Examiner*—Kenneth B. Wells
(74) *Attorney, Agent, or Firm*—Marger Johnson & McCollom, PC

(57) ABSTRACT

The intercept of a logarithmic amplifier is temperature stabilized by generating a signal having the form H log H where H is a function of temperature such as $T/T_0$. The first H factor is cancelled, thereby generating a correction signal having the form Y log H. The cancellation may be implemented with a transconductance cell having a hyperbolic tangent function. The H log H function may be generated by a pair of junctions biased by one temperature-stable current and one temperature-dependent current. The pair of junctions and the transconductance cell may be coupled together in a translinear loop. A user-accessible terminal may allow adjustment of the correction signal for different operating frequencies.

22 Claims, 2 Drawing Sheets

LOGARITHMIC TEMPERATURE COMPENSATION FOR DETECTORS

BACKGROUND

A logarithmic amplifier ("log amp") generates an output signal $V_{OUT}$ that is related to its input signal $V_{IN}$ by the following transfer function:

$$V_{OUT}=V_Y \log(V_{IN}/V_Z) \quad \text{Eq. 1}$$

where $V_Y$ is the slope and $V_Z$ is the intercept. To provide accurate operation, $V_Y$ and $V_Z$ should be stable over the entire operating temperature range of the log amp. In a monolithic implementation of a progressive compression type log amp, temperature compensation of the slope $V_Y$ is typically provided in the gain and detector cells since those are the structures that determine the slope. Temperature stabilization of the intercept $V_Z$, however, is typically provided at the front or back end of the log amp. For example, a passive attenuator with a loss that is proportional to absolute temperature (PTAT) may be interposed between the signal source and the log amp. Such an arrangement is disclosed in U.S. Pat. No. 4,990,803.

Another technique for temperature compensating the intercept of a log amp involves adding a carefully generated compensation signal to the output so as to cancel the inherent temperature dependency of the intercept. The intercept $V_Z$ of a typical progressive compression log amp is PTAT and can be expressed as a function of temperature T as follows:

$$V_Z = V_{Z0}\left(\frac{T}{T_0}\right) \quad \text{Eq. 2}$$

where $T_0$ is a reference temperature (usually 300° K.) and $V_{Z0}$ is the value of $V_Z$ at $T_0$. Substituting Eq. 2 into Eq. 1 provides the following expression:

$$V_{OUT} = V_Y \log\left[\left(\frac{V_{IN}}{V_{Z0}}\right)\left(\frac{T_0}{T}\right)\right] \quad \text{Eq. 3}$$

which can be rearranged as follows:

$$V_{OUT} = V_Y \log\left(\frac{V_{IN}}{V_{Z0}}\right) - \underbrace{V_Y \log\left(\frac{T}{T_0}\right)}_{\text{Temperature-dependent}} \quad \text{Eq. 4}$$

It has been shown that accurate intercept stabilization can be achieved by adding a correction signal equal to the second, temperature-dependent term in Eq. 4 to the output of a log amp, thereby canceling the temperature dependency. See, e.g., U.S. Pat. No. 4,990,803; and Barrie Gilbert, *Monolithic Logarithmic Amplifiers*, August 1994, § 5.2.4. A prior art circuit for introducing such a correction signal is described with reference to FIG. 19 in U.S. Pat. No. 4,990,803.

DETAILED DESCRIPTION

Figure 1:
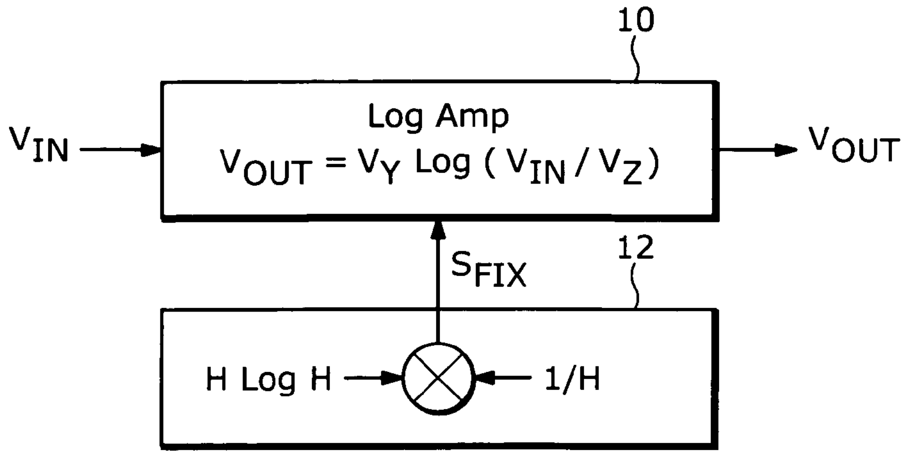
FIG. 1 illustrates an embodiment of a system for temperature compensating the intercept of a log amp according to the inventive principles of this patent disclosure.

FIG. 1 illustrates an embodiment of a system for temperature compensating the intercept of a log amp according to the inventive principles of this patent disclosure. The embodiment of FIG. 1 includes a temperature compensation circuit 12 that generates a correction signal $S_{FIX}$ having the form Y log $(T/T_0)$ where Y is a generic slope factor. Since the expression $T/T_0$ will be used frequently, it will be abbreviated as $H=T/T_0$ for convenience. The correction signal $S_{FIX}$ is applied to log amp 10 so as to temperature stabilize the intercept.

The temperature compensation circuit 12 generates the correction signal $S_{FIX}$ by multiplying a signal having the form H log H by some other factor having a 1/H component. Thus, the H and 1/H cancel, and the only temperature variation in the correction signal is of the form log H. Any suitable scaling may also be applied to obtain the slope factor Y required for the particular log amp being corrected.

Figure 2:
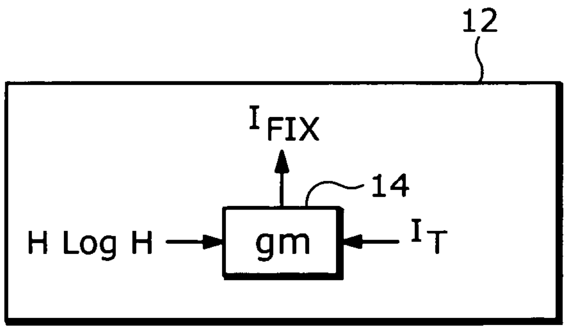
FIG. 2 illustrates an embodiment of a temperature compensation circuit for a log amp according to the inventive principles of this patent disclosure.

FIG. 2 illustrates an embodiment of a temperature compensation circuit according to the inventive principles of this patent disclosure. The embodiment of FIG. 2, which illustrates one possible technique for implementing the 1/H multiplication shown in FIG. 1, utilizes a transconductance (gm) cell 14. The transfer function of a generic gm cell has a hyperbolic tangent (tan h) form which may be stated as follows:

$$I_{OUT} = I_T \tanh\left(\frac{V_i}{V_T}\right) \quad \text{Eq. 5}$$

where $I_T$ is the bias or "tail" current through the gm cell, $V_i$ is the differential input voltage, and $V_T$ is the thermal voltage which may also be expressed as $V_T=V_{T0}(T/T_0)=V_{T0}H$. If the input signal to the gm cell is kept relatively small, the tanh function may be approximated as simply the operand itself:

$$I_{OUT} \approx I_T \frac{V_i}{V_T} \quad \text{Eq. 6}$$

Now, to implement the generic gm cell in the compensation circuit of FIG. 2, H log H is used as the input $V_i$ to the gm cell, the output current $I_{OUT}$ is used as the correction signal in the form of a current $I_{FIX}$, and $V_{T0}H$ is substituted for $V_T$:

$$I_{FIX} \approx I_T \frac{H\log H}{V_{T0}H} \qquad \text{Eq. 7}$$

Thus, H and 1/H cancel. If a temperature stable signal (sometimes referred to as a ZTAT signal where the Z stands for zero temperature coefficients) is used for $I_T$, then $I_T/V_{T0}$ is a temperature-stable constant that may be set to any suitable value Y to provide the correct slope. The final form of $I_{FIX}$ is then given by:

$$I_{FIX} \approx Y \log H \qquad \text{Eq. 8}$$

Therefore, the use of a transconductance cell with its inherent 1/H factor provides a simple and effective solution to generating a correction signal having the requisite log H characteristic.

Figure 3:
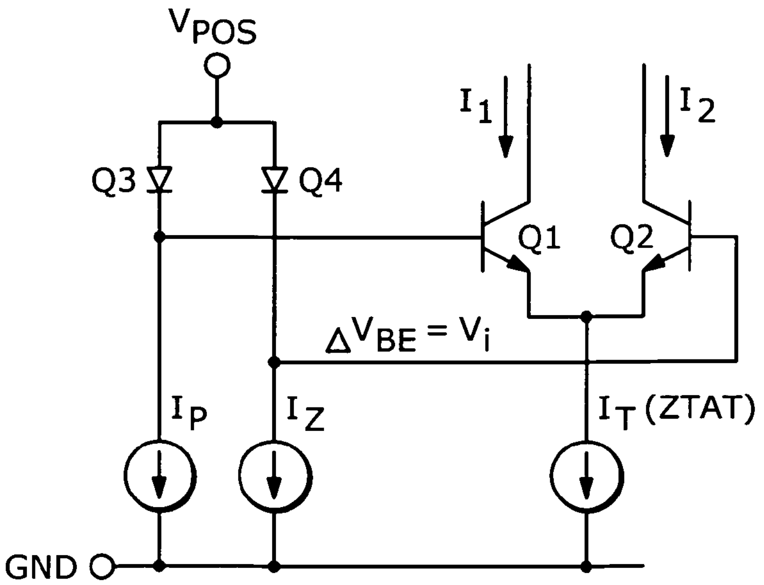
FIG. 3 illustrates another embodiment of a temperature compensation circuit for a log amp according to the inventive principles of this patent disclosure.

FIG. 3 illustrates another embodiment of a temperature compensation circuit according to the inventive principles of this patent disclosure. The embodiment of FIG. 3 uses a pair of diode-connected transistors biased by ZTAT and PTAT currents to generate the H log H function, which is then applied to a gm cell in a tightly integrated translinear loop.

Diode-connected transistors Q3 and Q4 are referenced to a positive power supply $V_{POS}$, and are biased by currents $I_P$ and $I_Z$, respectively. $I_Z$ is ZTAT, while $I_P$ is a PTAT current. The base-emitter voltages of Q3 and Q4 are:

$$V_{BE3} = V_T \ln\left(\frac{I_P}{I_S}\right) \qquad \text{Eq. 9}$$

$$V_{BE4} = V_T \ln\left(\frac{I_Z}{I_S}\right) \qquad \text{Eq. 10}$$

and therefore, the $\Delta V_{BE}$ across the bases of Q3 and Q4 is:

$$\Delta V_{BE} = V_{BE3} - V_{BE4} = V_T \ln\left(\frac{I_P}{I_S}\right) - V_T \ln\left(\frac{I_Z}{I_S}\right) \qquad \text{Eq. 11}$$

$$\Delta V_{BE} = V_T \ln\left(\frac{I_P}{I_S}\right)$$

Since $I_P$ can be expressed as $I_P = I_Z H$, and $V_T = V_{T0}H$:

$$\Delta V_{BE} = V_{T0} H \ln\left(\frac{I_Z H}{I_Z}\right) \qquad \text{Eq. 12}$$

$$\Delta V_{BE} = V_{T0} H \ln H$$

Thus, the $\Delta V_{BE}$ of Q3 and Q4 provide a signal having the form H log H, which is then applied as the input signal $V_i$ to the gm cell.

The gm cell is implemented as a differential pair of emitter-coupled transistors Q1 and Q2 that are biased by a ZTAT tail current $I_T$. The base-emitter junctions of Q1 and Q2 complete the translinear loop with the base-emitter junctions of Q3 and Q4. The output signal $I_{OUT}$ from the differential pair is taken as the difference between the collector currents $I_1$ and $I_2$ of transistors Q1 and Q2, respectively. Substituting $\Delta V_{BE}$ of Eq. 12 as $V_i$ in Eq. 6 provides:

$$I_{OUT} \approx I_T \frac{V_{T0} H \ln H}{V_{T0} H} \qquad \text{Eq. 13}$$

$$I_{OUT} \approx I_T \ln H$$

By exercising some care in the selection of the scale factor for $I_T$, the proper slope factor Y may be obtained. Since the output signal $I_{OUT}$ is in a differential form, it is easy to apply it as the compensation signal $I_{FIX}$ to the output of any log amp having differential current outputs. This is especially true in the case of many progressive compression log amps. $I_{FIX}$ can simply be connected to the same summing nodes that are used to collect the current outputs from the detector cells for the cascaded gain stages.

Figure 4:
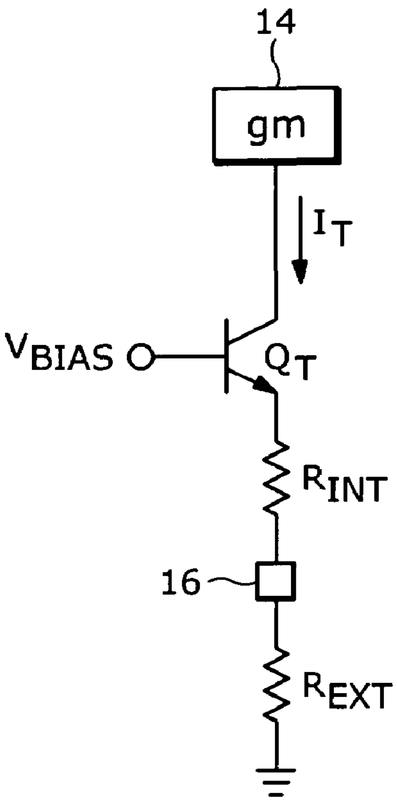
FIG. 4 illustrates an embodiment of a technique for providing adjustable intercept compensation to a log amp according to the inventive principles of this patent disclosure.

FIG. 4 illustrates an embodiment of a technique for providing adjustable intercept compensation to a log amp according to the inventive principles of this patent disclosure. In some implementations, the compensation techniques described above may be frequency dependent. That is, although adding a compensation signal of the form Y log H may stabilize the intercept over the entire operating temperature range at a given frequency, a different amount of compensation may be required at different operating frequencies. The embodiment of FIG. 4 provides a terminal 16 that allows a user to vary the amount of compensation depending on the operating frequency.

The example embodiment of FIG. 4 is fabricated on an integrated circuit (IC) chip, preferably including the target log amp to be temperature compensated. A transconductance cell 14, which generates the Y log H correction signal, is biased by a tail current $I_T$. The tail current is generated by a transistor $Q_T$ which in turn is biased by a voltage $V_{BIAS}$. The magnitude of the tail current is determined by the combination of an internal resistor $R_{INT}$ which is fabricated on the chip, and an external resistor $R_{EXT}$, which may be connected through terminal 16. The appropriate value of $R_{EXT}$ may be provided to the user through a lookup table, equation, etc.

Figure 5:
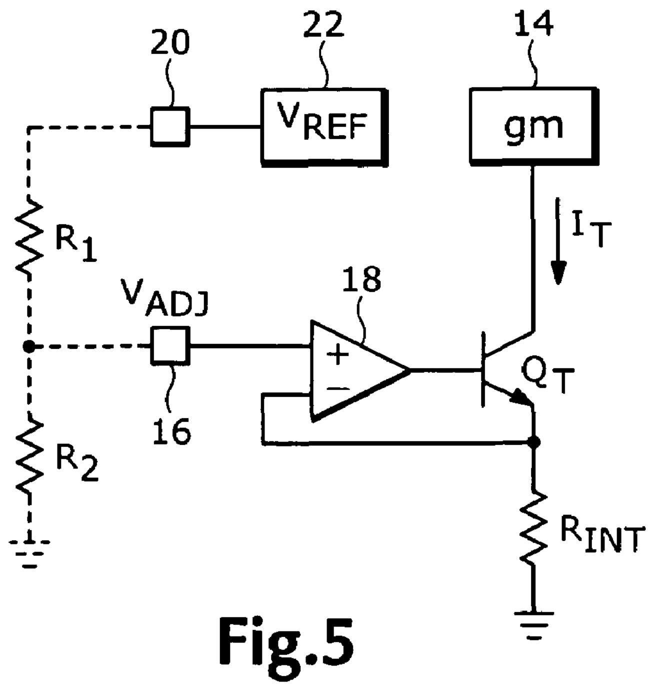
FIG. 5 illustrates another embodiment of a technique for providing adjustable intercept compensation to a log amp according to the inventive principles of this patent disclosure.

FIG. 5 illustrates another embodiment of a technique for providing adjustable intercept compensation to a log amp according to the inventive principles of this patent disclosure. As in the embodiment of FIG. 4, the embodiment of FIG. 5 includes a transconductance cell 14 biased by a tail current $I_T$ generated by transistor $Q_T$. Rather than setting the tail current directly through an external resistor, however, the current through $Q_T$ is set by an internal resistor $R_{INT}$ in combination with an operational amplifier (op amp) 18 arranged to drive the base of $Q_T$ in response to an adjustment signal $V_{ADJ}$ which is applied externally by the user through terminal 16. This eliminates any potential problems with mismatches between internal and external resistors. As an added feature, an on-chip reference voltage $V_{REF}$, which is typically available internally on the IC, can be made available to the user through another terminal 20. This enables the user to set the adjustment signal $V_{ADJ}$ using external divider resistors R1 and R2.

This patent disclosure encompasses numerous inventions relating to temperature compensation of log amps. These inventive principles have independent utility and are independently patentable. In some cases, additional benefits are realized when some of the principles are utilized in various combinations with one another, thus giving rise to yet more patentable inventions. These principles can be realized in countless different embodiments. Only the preferred embodiments have been described. Although some specific details are shown for purposes of illustrating the preferred embodiments, other equally effective arrangements can be devised in accordance with the inventive principles of this patent disclosure.

For example, some transistors have been illustrated as bipolar junction transistors (BJTs), but CMOS and other types of devices may be used as well. Likewise, some signals and mathematical values have been illustrated as voltages or currents, but the inventive principles of this patent disclosure are not limited to these particular signal modes. Also, the inventive principles relating to user-adjustable compensation are not limited to a specific form of temperature compensation, or even to temperature compensation in general. An integrated circuit according to the inventive principles of this patent disclosure may have a user-accessible terminal to adjust the magnitude of any type of compensation, e.g., temperature or frequency, to any type of measurement device.

The embodiments described above can be modified in arrangement and detail without departing from the inventive concepts. Thus, such changes and modifications are considered to fall within the scope of the following claims.

The invention claimed is:

1. A system comprising:

a temperature compensation circuit to generate a correction signal by multiplying a signal having the form H log H by a factor Y/H, where Y is a slope factor and H is a function of temperature.

2. A system according to claim 1 where the temperature compensation circuit comprises a transconductance cell to multiply the signal having the form H log H by the factor Y/H.

3. A system according to claim 1 where the transconductance cell implements a tan h function.

4. A system according to claim 1 where the temperature compensation circuit comprises a translinear loop.

5. A system according to claim 1 where the temperature compensation circuit comprises:

a pair of junctions arranged to provide the signal having the form H log H; and a transconductance cell coupled to the pair of junctions.

6. A system according to claim 5 where:

one of the junctions is biased by a PTAT current; and the other junction is biased by a ZTAT current.

7. A system according to claim 1 further comprising a log amp coupled to the temperature compensation circuit to receive the correction signal.

8. A system according to claim 7 where:

the log amp is a progressive compression type log amp having a differential structure; and the transconductance cell is coupled to a pair of summing nodes that are used to collect current outputs from detector cells for cascaded gain stages in the log amp.

9. A system according to claim 1 where the system is fabricated on an integrated circuit and further comprises:

a user-accessible terminal to allow a user to externally adjust the magnitude of the correction signal.

10. A system according to claim 9 where the temperature compensation circuit is constructed to adjust the magnitude of the correction signal by an external current setting resistor.

11. A system according to claim 9 where the temperature compensation circuit comprises a gm cell and a bias transistor in series with the user-accessible terminal.

12. A system according to claim 9 where the temperature compensation circuit is constructed to adjust the magnitude of the correction signal in response to a user-provided adjustment signal.

13. A system according to claim 12 further comprising a reference signal source coupled to a second user-accessible terminal.

14. A system according to claim 9 further comprising a log amp coupled to receive the correction signal.

15. A method comprising:

generating a first signal having the form H log H, where H is a function of temperature;

multiplying the first signal by a factor Y/H, thereby generating a correction signal having the form Y log H, where Y is a slope factor.

16. A method according to claim 15 where multiplying the first signal comprises applying the first signal to a transconductance cell.

17. A method according to claim 15 where multiplying the first signal comprises performing a tanh function on the first signal.

18. A method according to claim 15 where the first signal is multiplied in a translinear loop.

19. A method according to claim 15 where generating the first signal comprises:

biasing a first junction with a PTAT current; and biasing a second junction with a ZTAT current.

20. A method according to claim 19 further comprising applying the first signal to a transconductance cell.

21. A method according to claim 15 further comprising coupling the correction signal to a pair of summing nodes that are used to collect current outputs from detector cells for cascaded gain stages in a progressive compression log amp.

22. A method according to claim 15 further comprising coupling the correction signal to a log amp.

* * * * *

UNITED STATES PATENT AND TRADEMARK OFFICE

CERTIFICATE OF CORRECTION

PATENT NO. : 7,180,359 B2
APPLICATION NO. : 11/020897
DATED : February 20, 2007
INVENTOR(S) : Vincenzo Ditommaso It is certified that error appears in the above-identified patent and that said Letters Patent is hereby corrected as shown below:

Column 2, line 49, the word "tan h" should read -- tanh --;
Column 5, line 38, the word "tan h" should read -- tanh --.

Signed and Sealed this

Twenty-fifth Day of August, 2009

David J. Kappos
*Director of the United States Patent and Trademark Office*